May 19, 1959  F. S. HAHN  2,887,294
GAS LEAK
Filed Dec. 29, 1955
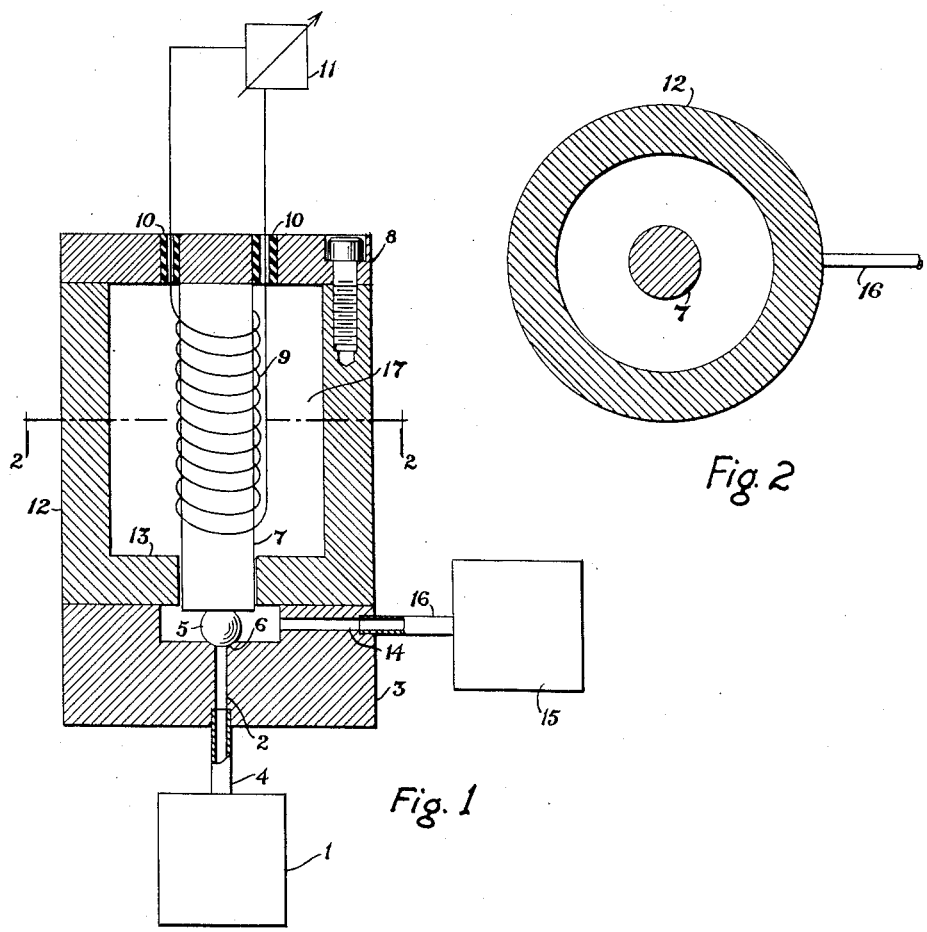
Fig. 1
Fig. 2
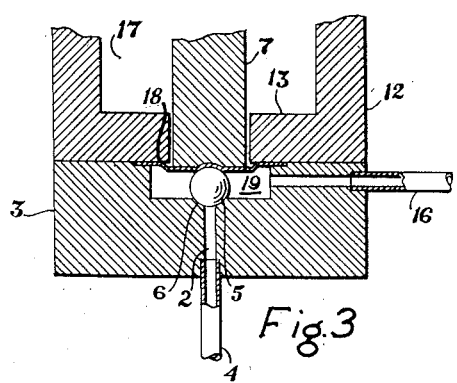
Fig. 3

2,887,294
GAS LEAK

Frederick S. Hahn, Watertown, Mass., assignor to High Voltage Engineering Corporation, Cambridge, Mass., a corporation of Massachusetts Application December 29, 1955, Serial No. 556,270

1 Claim. (Cl. 251—129)

This invention relates to gas leaks, such as those which are used to control the rate at which gas flows from a gas source into an evacuated region. In particular, the invention relates to mechanical gas leaks, wherein an apertured valve seat is covered by a valve closure member which may be pressed mechanically against the valve seat to close the aperture therein. The gas source is connected to the aperture by a suitable conduit in such a manner that the mechanical pressure on the valve closure member is opposed by the gas pressure. Release of the mechanical pressure allows the gas pressure to lift the valve closure member from the valve seat so as to open the aperture and permit gas to flow therethrough, and the rate of gas flow is controlled by varying the mechanical pressure on the valve closure member. In accordance with the invention, the valve closure member is supported upon one end of a rod of magnetostrictive material, and the other end of the rod is supported at a fixed distance from the valve seat. This fixed distance is such that the valve closure member is compressed tightly against the valve seat, thereby closing the aperture, when the maximum amount of residual flux remains in the rod. By subjecting the rod to the action of a magnetic field the length of the rod may be shortened so as to release the mechanical pressure on the valve closure member and thereby open the aperture. In this manner, the rate of gas flow is controlled by varying the intensity of the magnetic field to which the rod is subjected.

One use for gas leaks is in positive-ion accelerators in which positive ions are accelerated to high energy. The ions which are accelerated are obtained from an ion source comprising an ionizing device into which a suitable gas is introduced from a gas source through a gas leak. The most common positive ions which are accelerated are protons and deuterons. These are obtained from isotopes of hydrogen, and in such event the gas leak may comprise a tube of palladium. The porosity of palladium to hydrogen varies with temperature, so that the gas flow is controlled by varying the temperature of the palladium tube. For gases other than hydrogen, the palladium leak is not suitable, and other devices must be used.

A mechanical leak which has been used is the Cavendish leak, in which an aperture leading to the gas source is closed by a ball which is attached to a tungsten rod. The tungsten rod, in turn, is supported upon one end of a brass support the other end of which is fixed. When the device is heated, as by a suitable heating coil, the brass expands much more than the tungsten, so that the brass support lifts the rod away from the ball, whereby the pressure of the ball against the aperture is lessened, thus increasing the flow of gas through the aperture.

The principal objection to the Cavendish leak is the thermal lag associated therewith. That is, the brass support does not expand immediately upon energization of the heating coils, but there is a substantial time delay. Hence it is difficult to control the rate of gas flow accurately, and so the Cavendish leak is unsatisfactory for use in ion accelerators.

The invention provides a gas leak which is suitable for any gas, and which responds practically instantaneously to the applied signal.

The invention may best be understood from the following detailed description thereof, having reference to the accompanying drawing, in which:

Fig. 1 is a central section through a gas leak constructed in accordance with the invention, the electrical circuit used in connection therewith being indicated somewhat diagrammatically;

Fig. 2 is a cross-sectional view along the line 2—2 of Fig. 1; and

Fig. 3 is a central section similar to that of Fig. 1, showing a modified embodiment of the invention.

Referring to the drawing, and first to Figs. 1 and 2 thereof, gas from a gas source 1 is fed into an aperture 2 in a block 3 via a gas line 4. The aperture 2 may be closed off by means of a ball 5 which fits into a suitable seat 6 in the block 3. The block 3 may be made of a material such as brass or copper, and the ball 5 may be a hardened and ground steel ball, so that the ball 5 can form its own seat 6 into which it fits snugly so as to provide a vacuum-tight seal when the ball 5 is compressed against the seat 6.

The ball 5 is held firmly against the seat 6 by a rod 7 of magnetostrictive material. The ball 5 may, but need not, be soldered or welded to the rod 7. The rod 7 is soldered or welded to a plate 8 of magnetic material, such as iron or steel of low retentivity and reluctance. A coil 9 surrounds the rod 7, and the extremities thereof pass through insulated apertures 10 in the plate 8 to a variable D.C. supply 11, which energizes the coil 9. After the coil 9 has been fitted on the rod 7, the plate 8 is secured to a generally cylindrically shaped member 12 of magnetic material similar to that of which the plate 8 is composed, as by soldering, welding, or bolting. The cylinder 12 terminates in an inwardly projecting flange 13, which abuts against the rod 7 so as to prevent lateral movement thereof without impeding longitudinal movement thereof. Longitudinal movement of the rod 7 must be permitted, and so there is no vacuum-tight seal between the flange 13 and the rod 7. However, in the apparatus of Fig. 1 the apertures 10, the seal between the plate 8 and the cylinder 12, and the seal between the cylinder 12 and the block 3 must all be made vacuum tight.

The block 3 has, in addition to the aperture 2, a second aperture 14 which communicates with the chamber 15 to which the gas is to be delivered via a gas line 16. Such chamber 15 may be, for example, the ionization chamber of the ion source of an ion accelerator.

The rod 7 is preferably of a material which has a low retentivity and reluctance in addition to having magnetostrictive properties, such as nickel. The apparatus is then assembled in such a way that the ball 5 is compressed tightly against the seat 6 when no current flows through the coil 9 and when the maximum amount of residual flux remains in the rod 7. Then, as current is caused to flow through the coil 9 by adjustment of the D.C. source 11, the flux through the rod 7 increases, and the rod 7 contracts, thus releasing the pressure on the ball 5 and admitting gas from the source 1 through the aperture 2 into the chamber 17 bounded by the plate 8, the cylinder 12 and the block 3. The contraction of the rod 7, and hence the increase in gas flow, follows immediately upon adjustment of the voltage source 11. The gas leaves the chamber 17 via the second aperture 14 and flows into the utilization chamber 15.

The flange 13 on the cylinder 12 should abut against the rod 7 as closely as possible without impeding longitudinal motion of the rod 7 for two reasons. First, lateral movement of the rod 7 should be limited so that the rod 7 always pushes the ball 5 against the seat 6 in the same way. Second, the air gap between the rod 7 and the flange 13, which is a part of the magnetic circuit, should be as small as possible, in order to obtain maximum flux for a given current.

Owing to its magnetostrictive property, the rod 7 contracts as the magnetic flux therein increases. This contraction occurs regardless of the direction of the magnetic flux, assuming the latter to be longitudinally oriented in the rod 7. Assuming that the magnetic circuit comprising the plate 8, the cylinder 12, and the rod 7 has low reluctance with small residual flux, the amount of contraction will vary with the amount of current in the coil 9, irrespective of the direction of flow of current in the coil 9.

The power required to produce magnetostriction is very small; but there will be resistive losses in the coil 9 and other losses which will require a modest amount of power from the voltage source 11. The more magnetic material that is used, the greater the flux for a given current in the coil 9; but expense and bulk will place a limit on the size of the device used. Merely by way of example, the ball 5 may be about one-quarter inch in diameter. The smaller the ball, the greater the distance through which the rod 7 must contract; the larger the ball, the better the fit between the ball 5 and the seat 6.

As indicated, the entire chamber 17 may be filled with the gas, provided the chamber is vacuum tight. Hence, the exit aperture 14 may be located in the plate 8, or any other place, just as well as in the block 3 as shown in Fig. 1. However, in some cases it may be desirable to minimize the number of vacuum-tight seals required and also to minimize that portion of the volume of the chamber 17 which is accessible to the gas. In that event, the modification shown in Fig. 3 may be used.

Referring to said Fig. 3, the block 3, the cylinder 12, the ball 5, and the rod 7 are the same as those in Fig. 1. However, in the embodiment of the invention which is shown in Fig. 3, a flexible metal diaphragm 18 is clamped between the cylinder 12 and the block 3, so as to seal off the lower part 19 of the chamber 17. The diaphragm 18 also separates the rod 7 from the ball 5. In the embodiment of Fig. 3, therefore, only the lower part 19 of the chamber 17 is accessible to the gas, thereby reducing the number of vacuum-tight seals required.

Having thus described the principles of the invention, together with illustrative embodiments thereof, it is to be understood that although specific terms are employed, they are used in a generic and descriptive sense and not for purposes of limitation, the scope of the invention being set forth in the following claim.

I claim:

A mechanical gas leak adapted to admit gas into an evacuated ionization chamber from an ion source of an ion accelerator comprising, in combination with a source of gas and an evacuated enclosure into which said gas is to be admitted: a valve housing having a chamber therein and having a first aperture therein through which gas may be admitted into said chamber, the inner wall of said valve housing at said first aperture forming a valve seat made of relatively soft material; a rod of magnetostrictive material connected mechanically and magnetically at one end to a wall opposite said valve seat in said valve housing; a ball of relatively hard material supported at the other end of said rod; said rod and said ball being thus supported in such a manner that said ball is compressed tightly against said valve seat when the maximum amount of residual flux remains in said rod; a coil surrounding said rod; a D.C. voltage source connected to said coil and adapted to drive a non-oscillatory direct current through said coil; and a second aperture in said valve housing through which gas may issue from said chamber into said evacuated enclosure, said valve housing having an inwardly projecting flange which abuts against the side wall of said rod at said other end thereof so as to impede lateral movement thereof but permitting unimpeded longitudinal movement thereof, a sufficient portion of said valve housing being of magnetic material to provide a substantially closed magnetic circuit between the ends of said rod.

References Cited in the file of this patent

UNITED STATES PATENTS

| | | |
|---|---|---|
| 1,631,406 | Eisenhauser | June 7, 1927 |
| 1,691,602 | Ferrette | Nov. 13, 1928 |
| 2,332,787 | Fleming | Oct. 26, 1943 |
| 2,564,815 | Raymond | Aug. 21, 1951 |
| 2,621,905 | Daniell | Dec. 16, 1952 |